United States Patent
To et al.

(10) Patent No.: US 7,324,403 B2
(45) Date of Patent: Jan. 29, 2008

(54) LATENCY NORMALIZATION BY BALANCING EARLY AND LATE CLOCKS

(75) Inventors: Hing Yan To, Cupertino, CA (US); Joe Salmon, Placerville, CA (US); Mamun Ur Rashid, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 116 days.

(21) Appl. No.: 10/949,053

(22) Filed: Sep. 24, 2004

(65) Prior Publication Data

US 2006/0067155 A1    Mar. 30, 2006

(51) Int. Cl.
    *G11C 8/18*    (2006.01)
(52) U.S. Cl. ........................ 365/233; 365/194
(58) Field of Classification Search ................ 327/293, 327/297
    See application file for complete search history.

(56) References Cited

U.S. PATENT DOCUMENTS

| | | | | |
|---|---|---|---|---|
| 4,998,262 A * | 3/1991 | Wiggers | ..................... | 375/356 |
| 5,361,277 A | 11/1994 | Grover | | |
| 5,432,823 A * | 7/1995 | Gasbarro et al. | ........... | 375/356 |
| 5,812,835 A | 9/1998 | Ruuskanen | | |
| 5,896,055 A * | 4/1999 | Toyonaga et al. | ........... | 327/295 |
| 5,915,105 A * | 6/1999 | Farmwald et al. | .......... | 710/305 |
| 6,150,866 A * | 11/2000 | Eto et al. | .................... | 327/297 |
| 6,330,627 B1 * | 12/2001 | Toda | ........................... | 710/104 |
| 6,449,727 B1 * | 9/2002 | Toda | .......................... | 713/401 |
| 7,042,268 B2 * | 5/2006 | Saeki | .......................... | 327/293 |
| 7,043,657 B1 * | 5/2006 | Yang et al. | ................... | 713/503 |
| 7,119,599 B2 * | 10/2006 | Saeki | .......................... | 327/293 |

FOREIGN PATENT DOCUMENTS

| | | |
|---|---|---|
| EP | 0687069 A | 12/1995 |
| EP | 1150427 A | 10/2001 |
| JP | 05-12223 | 1/1993 |

OTHER PUBLICATIONS

International Search Report, mailed Apr. 12, 2006. 4 pages.
Written Opinion of the International Search Authority, mailed Apr. 12, 2006. 7 pages.
Rambus Preliminary Information, Direct RDRAM™ 256/288-Mbit (1M×16/18×16d), Document DL0105, Version 1.1, © Copyright Aug. 2000 Rambus Inc., 2465 Latham Street, Mountain View, CA, USA 94040, Written by: Frederick A. Ware, 72 pages, http://rambus.com/downloads/rdram.256d.0105-1.1.book.pdf.
RDRAM Direct Rambus™ Clock Generator, Document DL0056, Verision 1.3, Preliminary Information, Copyright ® Apr. 2002, Rambus Inc., 4440 El Camino Real, Los Altos, CA, USA 94022, 22 pages, http://rambus.com/downloads/DRCG_d_0056_V1_3.pdf.
Intel® Pentium® 4 processor in the 478-pin Package/Intel® 850 Chipset Family Platform, Design Guide, Jan. 2003, Document No.: 249888-008, pp. 48-55, ftp://download.intel.com/design/Pentium4/guides/24988808.pdf.
PCT Written Opinion for PCT Appln. No. US2005/032927, mailed Apr. 5, 2007 (9 pages).

* cited by examiner

*Primary Examiner*—Tan T. Nguyen
(74) *Attorney, Agent, or Firm*—Derek J. Reynolds

(57) ABSTRACT

A method, apparatus, and system are disclosed. In one embodiment the method comprises inputting an early clock signal and a late clock signal to a memory device and generating an average clock signal for the memory device by averaging the early clock signal and the late clock signal.

30 Claims, 4 Drawing Sheets

LATENCY NORMALIZATION BY BALANCING EARLY AND LATE CLOCKS

FIELD OF THE INVENTION

The invention relates to system memory. More specifically, the invention relates to normalizing the latency of the memory devices located on an inline memory module.

BACKGROUND OF THE INVENTION

In modern computers, clock signal timing for system memory is critical to assure robust operation of the memory channel. Many memory subsystems are designed in a daisy chain configuration. In a daisy chain configuration memory subsystem, a source synchronous operation originating from the memory controller hub (MCH) will send command, address, and control information with a memory channel clock to the dynamic random access memory (DRAM) devices, which are connected in series. In this scenario the first DRAM device in the chain receives the command/address/control information before the other DRAM devices, the second DRAM device receives the command/address/control information after first DRAM device but before the other DRAM devices, and so on until the last DRAM device receives the command/address/control information after all other DRAM devices.

Thus, each DRAM device is activated at a unique time based on the transit time needed for the command/address/control information to travel from the Memory Controller Hub (MCH) to each respective DRAM device. These unique activation times for each DRAM device means that each DRAM device sends data back to the MCH at a different and unique time, thus creating unequal latencies for all the devices. In today's computer systems, in order to protect from memory channel data corruption involving unequal DRAM latencies, the MCH must normalize the DRAM latencies. To accomplish DRAM latency normalization the MCH can incorporate additional circuitry to buffer the incoming data. Though, this method is not desirable because of the extra circuitry added within the MCH. The MCH can also accomplish this by adding extra timing delays to its memory channel to eliminate the possibility of memory corruption because of the discrepancy in DRAM latencies. This solution is also not desirable because of added delays in MCH timing lowers system performance.

BRIEF DESCRIPTION OF THE DRAWINGS

The present invention is illustrated by way of example and is not limited by the figures of the accompanying drawings, in which like references indicate similar elements, and in which.

DETAILED DESCRIPTION OF THE INVENTION

Embodiments of an effective method to normalize the latency of system memory by balancing early and late clocks are disclosed. In the following description, numerous specific details are set forth. However, it is understood that embodiments may be practiced without these specific details. In other instances, well-known elements, specifications, and protocols have not been discussed in detail in order to avoid obscuring the present invention.

Figure 1:
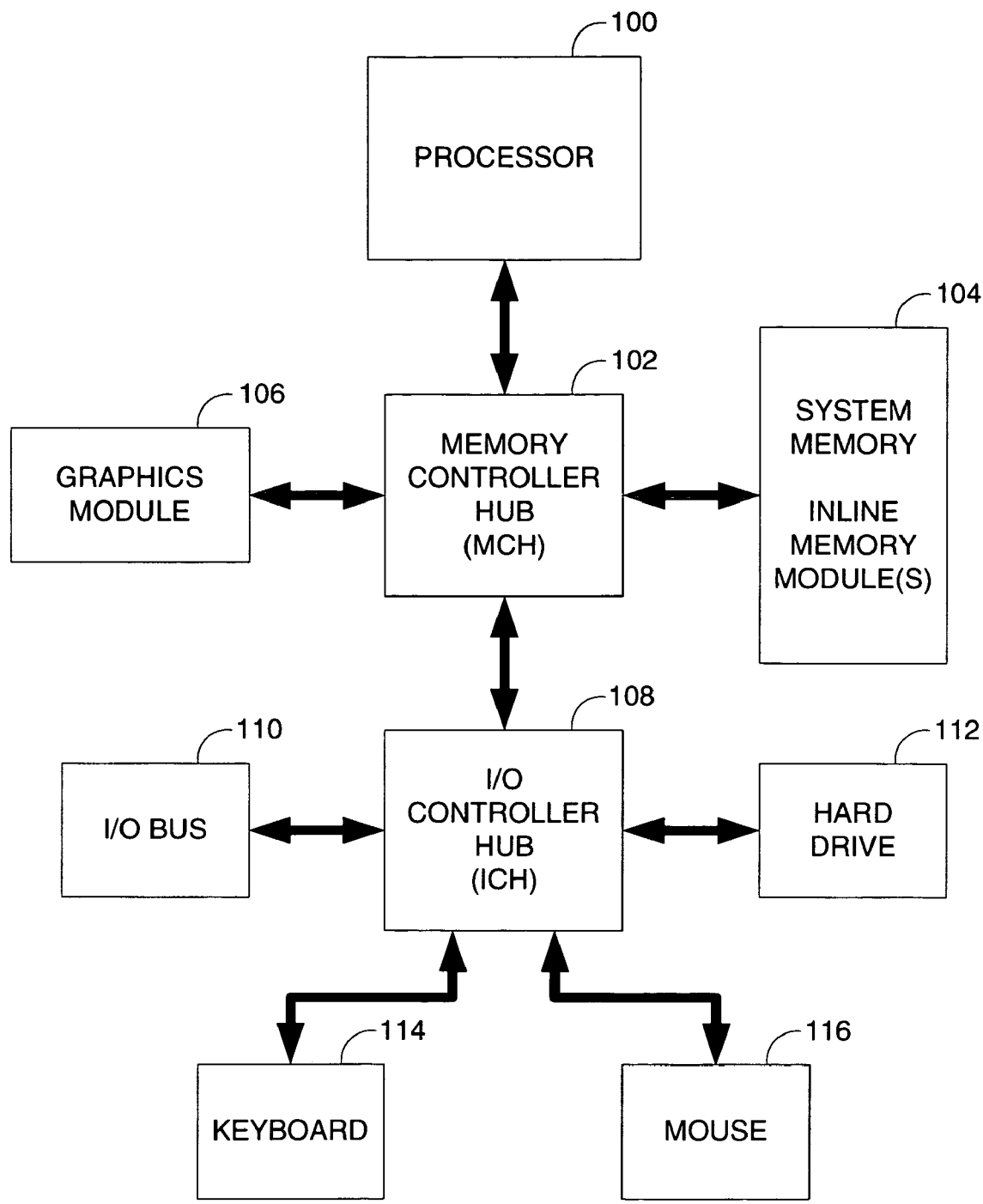
FIG. 1 illustrates a computer system in which system memory latency can be normalized in one embodiment of the invention.

FIG. 1 illustrates a computer system in which system memory latency can be normalized in one embodiment. A processor 100 is connected to a memory controller hub (MCH) 102 through a bus (sometimes referred to as a host bus). The MCH 102 allows access to system memory 104 that may be composed of a number of DRAM devices situated on inline memory modules (explained in detail in FIG. 2). The MCH 102 allows the processor to access a graphics module 106, such as an accelerated graphics port (AGP) graphics device that connects to a cathode ray tube (CRT), a liquid crystal display (LCD), or another type of display device. The MCH 102 also allows the processor to access an I/O controller hub (ICH) 108. A number of conventional agents may be connected to the ICH 108, such as an I/O bus 110 (PCI, USB, etc), a hard disk drive 112, a keyboard controller 114, and a mouse controller 116, among many other possible devices. In one embodiment, components of the computer system illustrated in FIG. 1 are connected through buses on a printed circuit board (e.g. a motherboard). The individual bus lines are etched into the printed circuit board in the form of traces. One such trace line is the clock signal trace that runs between the MCH 102 and the system memory 104.

Figure 2:
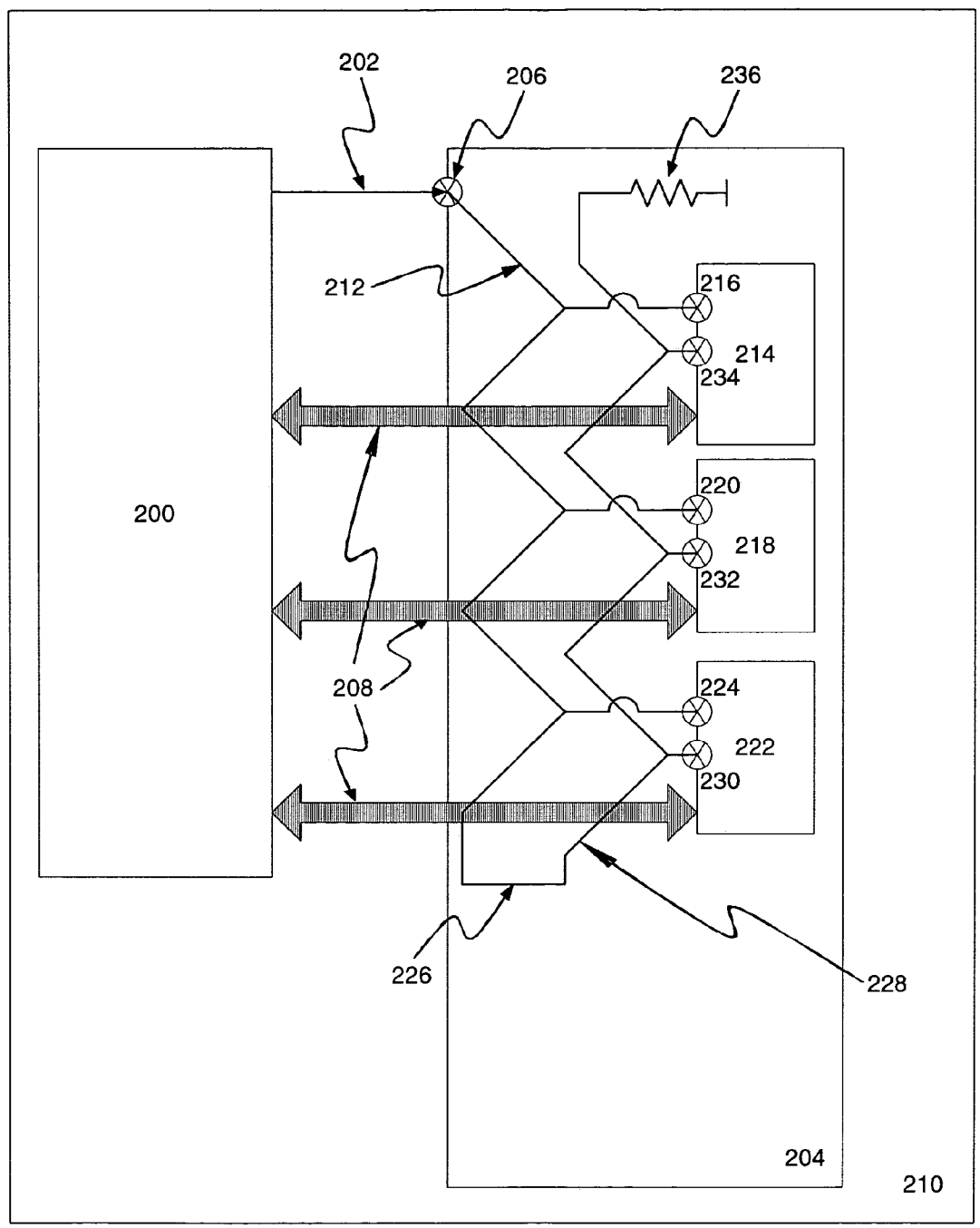
FIG. 2 depicts the clock signal trace that runs between the MCH and an inline memory module in one embodiment of the invention.

FIG. 2 depicts the clock signal trace that runs between the MCH 200 and an inline memory module 204 in one embodiment of the invention. The inline memory module 204 comprises either all or part of the system memory in the computer system. The MCH 200 sends a specific edge of a clock signal, hereafter referred to as the "clock signal edge," over a clock bus trace 202 to the inline memory module 204. In one embodiment the specific edge of the clock signal may be a rising edge. In another embodiment, the specific edge of the clock signal may be a falling edge. The clock bus trace 202 connects to the inline memory module 204 via a clock pin 206. In one embodiment, the clock pin 206 is one of many pins that connect inline memory module 204 to the MCH 200. Additionally, data is transferred across data bus 208 between the memory devices and the MCH in response to data read or write commands. In other embodiments, motherboard 210 can be any type of printed circuit board that bus traces can be routed across, such as an add-in daughter card. In one embodiment, the clock pin 206 connects to the clock bus trace 202 through a dual inline memory module (DIMM) socket connection. In one embodiment, the command/address/control bus traces follow a path similar to the clock bus trace 202.

The inline memory module 204 is populated with one or more DRAM memory devices. In different embodiments, alternate forms of RAM memory can be configured on the inline memory module 204 apart from the standard DRAM. FIG. 2 illustrates an embodiment with three memory devices (214, 218, and 222) although in different embodiments there can be any number of memory devices. In a standard configuration there are eight or nine memory devices located on the inline memory module 204, although any inline memory module 204 with two or more memory devices is applicable. Once the clock signal passes through clock pin 206 it is initially routed across the inline memory module 204 via early clock signal trace path 212 to memory device 214 through early clock signal input pin 216. The "early" clock signal is defined as a first clock signal received by each memory device. The clock signal edge continues down early clock signal trace path 212 to memory devices 218 and 222 through early clock signal pins 220 and 224, respectively.

There is a finite time that the clock signal edge takes to reach each of these consecutive pins. Thus, memory device 214 receives the clock signal edge through early clock signal pin 216 before the other two memory devices because the length of the early clock signal trace path 212 from the inline memory module's 204 clock pin 206 to memory device's 214 early clock signal pin 216 is the shortest. Whereas, memory device 222 will receive the clock signal edge through early clock signal pin 224 after the other two memory devices because the length of the early clock signal trace path 212 from the inline memory module's 204 clock pin 206 to memory device's 222 early clock signal pin 224 is the longest. The clock signal edge that is received by each memory device through its early clock signal pin is deemed the "early" clock signal.

Once the clock signal edge has reached all memory devices (i.e. the clock signal edge has finished traveling through the early clock signal trace path 212), the clock signal edge next travels through a loop trace path 226. When the clock signal edge has looped around the loop trace path 226 it travels back up the late clock signal trace path 228 to all the memory devices for a second time. The "late" clock signal is defined as a second clock signal received by each memory device. On this pass the clock signal edge first arrives at memory device's 222 late clock signal pin 230. The clock signal edge subsequently arrives at memory devices 218 and 214 through late clock signal pins 232 and 234, respectively. The clock signal edge that is received by each memory device through its late clock signal pin is deemed the "late" clock signal. When the clock signal edge arrives at each memory device for the late clock signal pass, it arrives in the opposite order as it did during the early clock signal pass. Thus, memory device 222 has the most delayed "early" clock signal but the least delayed "late" clock signal. In the same regard, memory device 214 has the least delayed "early" clock signal but the most delayed "late" clock signal.

Finally, once the clock signal edge has completed its "early" and "late" pass, the clock signal edge terminates on the inline memory module 204 by arriving at terminating resistor 236. In one embodiment, the layout of the early clock signal trace 212, the loop trace 226, and the late clock signal trace 228 allow for a symmetrical timing functionality on all memory devices such that the average of each coupled "early" and "late" clock signal will create an "average" clock signal that is equal for all memory devices on the inline memory module 204.

In one embodiment, a first-in-first-out buffer (FIFO) is placed within each memory device coupled to the command/control bus. The FIFO latches the incoming control/command/address on the command/control bus with each memory device's early clock signal. Then the FIFO releases the control/command/address to the core of each memory device with the average clock signal. Subsequently, all command/control operations within each memory device occur synchronously with the average clock.

Figure 3:
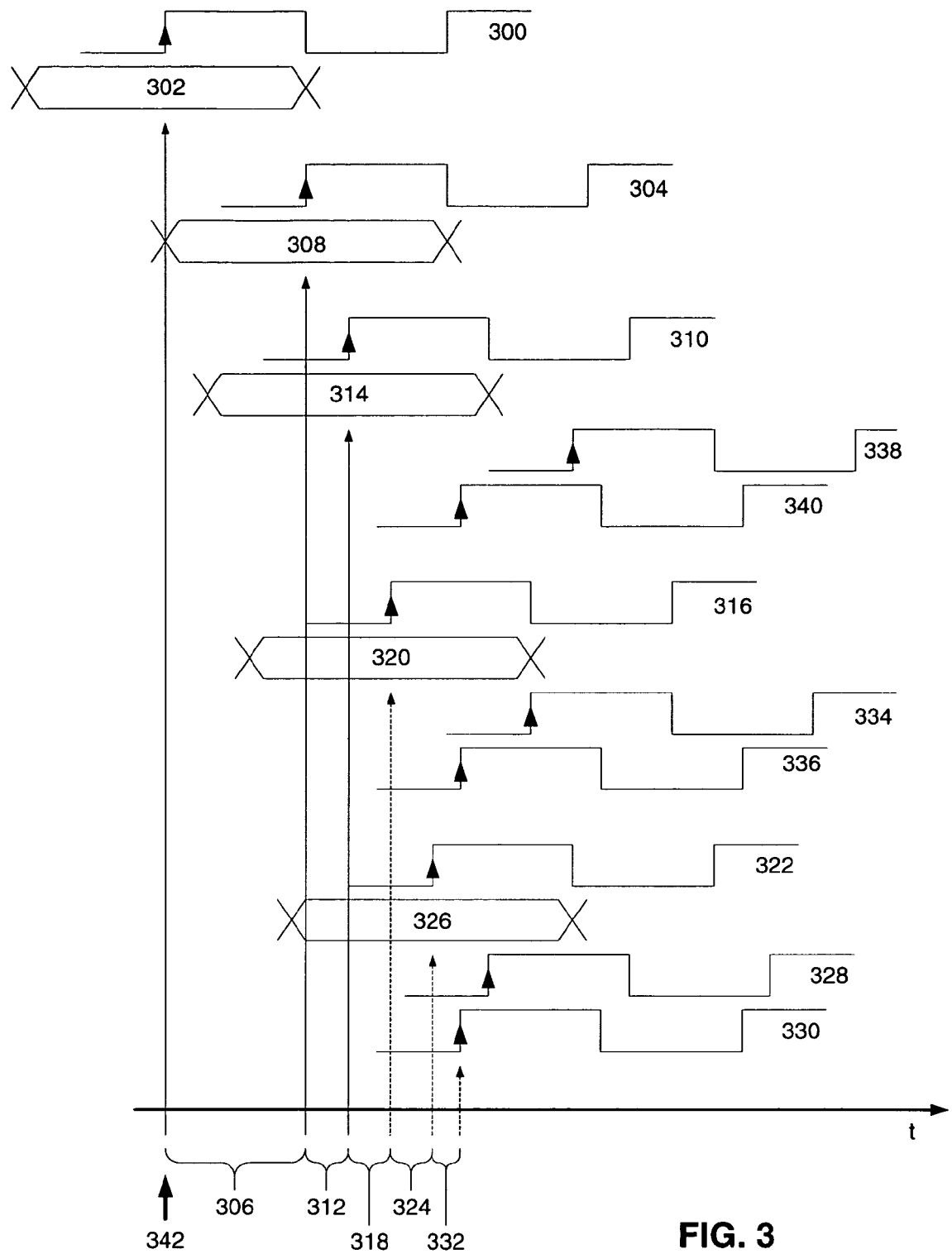
FIG. 3 describes the timing diagram of the early, late, and average clock signals for three memory devices in one embodiment of the invention.

FIG. 3 describes the timing diagram of the early, late, and average clock signals for three memory devices in one embodiment of the invention. In this diagram, time zero corresponds to position 342 on the timeline. At time zero, the MCH in a computer system initiates a data read or write cycle on the edge of the MCH clock signal 300. The data read or write cycle is indicated by a command 302 that is issued to the memory devices. In one embodiment, the command 302 is also accompanied by an address. The specific clock signal edge is hereafter referred to as the "clock signal rising edge," although in another embodiment, the specific clock signal edge may be a falling edge. The validity of the command 302 may be guaranteed for a necessary setup time before the clock signal rising edge and a necessary hold time after the clock signal rising edge. Thus, the command 302 may be centered around the clock signal rising edge (as shown in FIG. 3). The clock signal rising edge has a transit time between its origination at the MCH and its arrival at the inline memory module through a clock pin. This transit time is represented by time delay 306 (i.e. latency 306). Thus, after a time delay 306 the clock signal rising edge reaches the clock pin on the inline memory module, shown with clock signal 304. Once again the command 308 is valid for an entire cycle from one rising edge of the clock signal to the next rising edge (represented by clock signal 304). The command represented by 302 and 308 is the same command, just delayed by time delay 306 due to the transit time from the MCH to the clock pin on the inline memory module.

Next, the clock signal rising edge travels from the clock pin on the inline memory module to the first memory device. The clock signal rising edge transit time between the clock pin on the inline memory module and the first memory device is represented by time delay 312. Thus, after time delay 312 the clock signal rising edge reaches the first memory device, shown with clock signal 310, this represents the first memory device's early clock signal. The command 314 is valid for an entire cycle of the clock signal (i.e. between the two rising edges shown on the first memory device clock signal 310). Again, the command represented by 314 is the same command as 302 and 308, just delayed in time based on the clock signal rising edge transit time from MCH time zero 342 to the clock signal rising edge arrival at the first memory device (i.e. time delay 306+time delay 312).

The clock signal rising edge then travels from the first memory device to the second memory device. The clock signal rising edge transit time between the first memory device and the second memory device is represented by time delay 318. Thus, after time delay 318 the clock signal rising edge reaches the second memory device, shown with clock signal 316, this represents the second memory device's early clock signal. The command 320 is valid for an entire cycle of the clock signal (i.e. between the two rising edges shown on the second memory device clock signal 316). The command represented by 320 is the same command as 302, 308, and 314, just delayed in time based on the clock signal rising edge transit time from MCH time zero 342 to the clock signal rising edge arrival at the second memory device (i.e. time delay 306+time delay 312+time delay 318).

Next, the clock signal rising edge travels from the second memory device to the third memory device. The clock signal rising edge transit time between the second memory device and the third memory device is represented by time delay 324. Thus, after time delay 324 the clock signal rising edge reaches the third memory device, shown with clock signal 322, this represents the third memory device's early clock signal. The command 326 is valid for an entire cycle of the clock signal (i.e. between the two rising edges shown on the third memory device clock signal 322). The command represented by 326 is the same command as 302, 308, 314, and 320, just delayed in time based on the clock signal rising edge transit time from MCH time zero 342 to the clock signal rising edge arrival at the third memory device (i.e. time delay 306+time delay 312+time delay 318+time delay 324).

Once the clock signal rising edge has arrived at all memory devices on the inline memory module it then travels through a loop trace on the inline memory module. Then the clock signal rising edge arrives back at the third memory device for a second time as the third memory device's late clock signal, represented by clock signal 328. At this point the third memory device generates an internal average clock signal for itself. The average clock signal (represented by clock signal 330) is generated by creating a clock signal with a rising edge that is located halfway between the rising edge of the early clock signal 322 and the rising edge of the late clock signal 328. Thus, the third memory device's average clock signal 330 is delayed in time after the early clock signal rising edge 322 by time delay 332.

Next, the clock signal rising edge arrives back at the second memory device for a second time as the second memory device's late clock signal, represented by clock signal 334. At this point the second memory device generates an internal average clock signal for itself. The average clock signal (represented by clock signal 336) is generated by creating a clock signal with a rising edge that is located halfway between the rising edge of the early clock signal 316 and the rising edge of the late clock signal 334. The second memory device's average clock signal 336 is delayed in time after its early clock signal rising edge 316 by a time delay equivalent to time delay 332+time delay 324.

Finally, the clock signal rising edge arrives back at the first memory device for a second time as the first memory device's late clock signal, represented by clock signal 338. At this point the first memory device generates an internal average clock signal for itself. The average clock signal (represented by clock signal 340) is generated by creating a clock signal with a rising edge that is located halfway between the rising edge of the early clock signal 310 and the rising edge of the late clock signal 338. The third memory device's average clock signal 340 is delayed in time after its early clock signal rising edge 310 by a time delay equivalent to time delay 332+time delay 324+time delay 318.

Thus, an average clock signal for all three memory devices is created independently. Specifically, each device creates its own average clock internally A specific rising edge of the average clock signal is identical for all three memory devices with no time delays between devices (i.e. average clock signals 330, 336, and 340 are equivalent in terms of delay and phase with respect to the MCH). Consequently, there is now one clock domain for all memory devices. Each memory device may use the average clock to align I/O transfers to the memory device and align memory device transfers to the I/O. Thus, when using the average clock to send data from the memory devices to the MCH, it will arrive at the same time, with the MCH perceiving no time delays between receiving data from any of the memory devices. In different embodiments, this methodology for creating an equivalent average clock signal can be extended to any number of memory devices (e.g. 2, 3, 4, 8, 16, etc).

Figure 4:
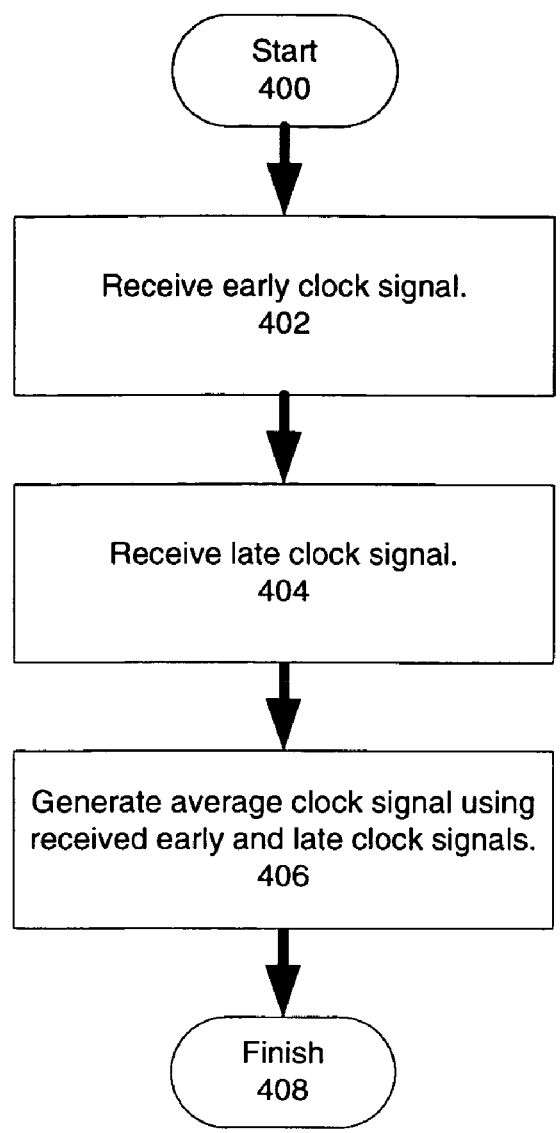
FIG. 4 illustrates a method to generate an average clock signal in one embodiment of the invention.

FIG. 4 illustrates a method to generate an average clock signal in one embodiment of the invention. At the start 400 of the method an early clock signal is received by a memory device 402. In one embodiment, this early clock signal can be generated from an MCH. In other embodiments, the clock signal can be generated from any integrated circuit or clock component in a computer system. In one embodiment, the clock signal is received through a trace. The trace can be routed across a motherboard, an inline memory module, and/or any other form of medium on which traces are routed. Next, a late clock signal is received by the memory device 404. In one embodiment, this late clock signal is the same clock signal as the early clock signal but delayed by additional transit time due to being routed through lengthier trace. Finally, an average clock signal is generated by the memory device using the received early clock signal and late clock signal 406 and the method is finished 408. In one embodiment, the average clock signal is generated by determining the time of the rising edge of the early clock signal, determining the time of the rising edge of the late clock signal, and creating an average clock signal that is has a rising edge at a time halfway between the time of the rising edge of the early clock signal and the time of the rising edge of the late clock signal.

Thus, embodiments of an effective method to normalize the latency of system memory by balancing early and late clocks are disclosed. These embodiments have been described with reference to specific exemplary embodiments thereof. It will, however, be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A method, comprising:
    sending a clock signal across a clock signal trace from a chipset to a first memory device and a second memory device, both memory devices located on a memory module, wherein the chipset is discrete from the memory module;
    the first memory device and the second memory device receiving the clock signal a first time as an early clock signal;
    the first memory device and the second memory device receiving the clock signal a second time as a late clock signal;
    the first memory device and the second memory device generating average clock signals by
    determining a timing sequence of the early clock signal,
    determining a timing sequence of the late clock signal, and
    creating an average clock signal that has a timing sequence halfway between the timing sequence of the early clock signal and the timing sequence of the late clock signal, wherein the first memory device's average clock signal and the second memory device's average clock signal are synchronous; and
    terminating the clock signal on the memory module with a termination resistor after the first and second memory devices have received both the early and late clock signals.

2. The method of claim 1, wherein the first early clock signal and the late clock signal are derived from a single clock signal tapped at different points along a single clock signal trace.

3. The method of claim 1, wherein the average clock signal of the first memory device and the average clock signal of the second memory device further comprise a pair of clock signals with the same relative phase.

4. An apparatus, comprising:
a clock signal trace originating from a chipset;
a memory device, residing on a memory module, wherein the memory module is discrete from the chipset, the memory device operable to:
receive an early clock signal from the clock signal trace and a late clock signal from the clock signal trace;
determine a timing sequence of the early clock signal,
determine a timing sequence of the late clock signal, and
generate an average clock signal that has a timing sequence halfway between the timing sequence of the early clock signal and the timing sequence of the late clock signal; and
a termination resistor, residing on the memory module, at the end of the clock signal trace to terminate the clock signal after the memory device has received both the early and late clock signals.

5. The apparatus of claim 4, wherein the clock signal trace is routed through a looping trace between an early clock signal input on the memory and a late clock signal input on the memory device.

6. The apparatus of claim 5, wherein the clock signal trace is further operable to:
route the clock signal from a printed circuit board to the early clock signal input on the memory device;
route the clock signal from the early clock signal input on the memory device through the looping trace to the late clock signal input on the memory device; and
route the clock signal from the late clock signal input on the memory device to the termination resistor.

7. The apparatus of claim 6, wherein the apparatus is further operable to connect two or more memory devices to the printed circuit board.

8. The apparatus of claim 7, wherein the two or more memory devices are further operable to each generate an average clock signal, wherein all generated average clock signals are synchronous.

9. The apparatus of claim 5, further comprising an inline memory module, the inline memory module is operable to:
couple the memory device to a printed circuit board; and
contain the clock signal trace routed from the printed circuit board to the memory device unit.

10. The apparatus of claim 9, wherein the inline memory module is further operable to connect two or more memory devices to the printed circuit board.

11. The apparatus of claim 10, wherein the two or more memory devices are further operable to each generate an average clock signal that is synchronous with at least one other signal.

12. The apparatus of claim 9, wherein the clock signal trace is further operable to:
route the clock signal from the printed circuit board to the early clock signal input on the memory device;
route the clock signal from the early clock signal input on the memory device through the looping trace to the late clock signal input on the memory device; and
route the clock signal from the late clock signal input on the memory device to the termination resistor.

13. The apparatus of claim 12, wherein the termination resistor is located on the inline memory module.

14. A method, comprising:
a memory device, residing on a memory module, wherein the memory module is discrete from a chipset, receiving an early clock signal and a late clock signal from the chipset;
the memory device generating an average clock signal by determining a timing sequence of the early clock signal, determining a timing sequence of the late clock signal, and
creating an average clock signal that has a timing sequence halfway between the timing sequence of the early clock signal and the timing sequence of the late clock signal; and
terminating the clock signal with a termination resistor after the memory device have received both the early and late clock signals, the termination resistor residing on the memory module.

15. The method of claim 14, wherein the early clock signal and the late clock signal are derived from a single clock signal tapped at different points along a single clock signal trace.

16. The method of claim 15, further comprising inputting the clock signal to one or more memory devices located on an inline memory module.

17. The method of claim 16, further comprising:
the one or more memory devices receiving the clock signal as the early clock signal;
the one or more memory devices receiving the clock signal as the late clock signal.

18. The method of claim 17, further comprising generating an average clock signal for each of the one or more memory devices by averaging the early clock signal and the late clock signal associated with each memory device.

19. The method of claim 14, wherein generating an average clock signal further comprises:
determining a timing sequence of the early clock signal;
determining a timing sequence of the late clock signal; and
creating an average clock signal that is has a timing sequence halfway between the timing sequence of the early clock signal and the timing sequence of the late clock signal.

20. The method of claim 19, wherein the average clock signal of the first memory device and the average clock signal of the second memory device further comprise a pair of clock signals with the same relative phase.

21. A system, comprising:
a clock signal trace;
a chipset coupled to the clock signal trace; and
a memory device coupled to the clock signal trace, wherein the memory device is located on a memory module, the memory module discrete from the chipset, the memory device operable to:
receive an early clock signal from the clock signal trace and a late clock signal from the clock signal trace;
determine a timing sequence of the early clock signal;
determine a timing sequence of the late clock signal; and
generate an average clock signal that has a timing sequence halfway between the timing sequence of the early clock signal and the timing sequence of the late clock signal; and
a termination resistor at the end of the clock signal trace to terminate the clock signal after the memory device has received both the early and late clock signals, the termination resistor residing on the memory module.

22. The system of claim 21, wherein the clock signal trace is routed through a looping trace between an early clock signal input on the memory and a late clock signal input on the memory device.

23. The system of claim 22, further comprising an inline memory module, the inline memory module is operable to:
couple the memory device to a printed circuit board; and
contain the clock signal trace routed from the printed circuit board to the memory device unit.

24. The system of claim 23, wherein the clock signal trace is further operable to:
- route the clock signal from the printed circuit board to the early clock signal input on the memory device;
- route the clock signal from the early clock signal input on the memory device through the looping trace to the late clock signal input on the memory device; and
- route the clock signal from the late clock signal input on the memory device to the termination resistor.

25. The system of claim 24, wherein the termination resistor is located on the inline memory module.

26. The system of claim 23, wherein the inline memory module is further operable to connect two or more memory devices to the printed circuit board.

27. The system of claim 26, wherein the two or more memory devices are further operable to each generate an average clock signal, wherein all generated average clock signals are synchronous.

28. The system of claim 21, wherein the clock signal trace is further operable to:
- route the clock signal from a printed circuit board to the early clock signal input on the memory device;
- route the clock signal from the early clock signal input on the memory device through the looping trace to the late clock signal input on the memory device; and
- route the clock signal from the late clock signal input on the memory device to the termination resistor.

29. The system of claim 28, wherein the clock signal trace is further operable to connect two or more memory devices to the printed circuit board.

30. The system of claim 29, wherein the two or more memory devices are further operable to each generate an average clock signal, wherein all generated average clock signals are synchronous.

* * * * *